United States Patent
Su et al.

(10) Patent No.: US 6,168,826 B1
(45) Date of Patent: Jan. 2, 2001

(54) BIAXIALLY ORIENTED POLYETHYLENE FILM WITH IMPROVED OPTICS AND SEALABILITY PROPERTIES

(75) Inventors: Tien-Kuei Su; Robert V. Poirer, both of Fairport, NY (US)

(73) Assignee: Mobil Oil Corporation, Fairfax, VA (US)

(*) Notice: Under 35 U.S.C. 154(b), the term of this patent shall be extended for 0 days.

(21) Appl. No.: 09/220,983

(22) Filed: Dec. 23, 1998

(51) Int. Cl.$^7$ ............................. B32B 27/08; B32B 31/16; B05D 3/12
(52) U.S. Cl. .................... 427/173; 427/358; 427/412.3; 264/173.14; 264/173.15; 264/173.19; 264/290.2; 156/244.23; 156/244.24; 428/515; 428/516; 428/910
(58) Field of Search ................................ 427/172, 173, 427/322, 356, 358, 412.3; 264/173.14, 173.15, 173.19, 288.4, 290.2; 428/515, 516, 910; 156/244.23, 244.24

(56) References Cited

U.S. PATENT DOCUMENTS

| | | |
|---|---|---|
| 4,359,553 | 11/1982 | Edwards . |
| 4,427,833 | 1/1984 | Edwards . |
| 4,692,386 * | 9/1987 | Schinkel et al. ............ 428/910 |
| 4,865,908 | 9/1989 | Liu et al. . |
| 4,870,122 | 9/1989 | Lu . |
| 4,916,025 | 4/1990 | Lu . |
| 5,268,230 | 12/1993 | Edwards . |
| 5,302,327 | 4/1994 | Chu et al. . |
| 5,302,442 | 4/1994 | O'Brien et al. . |
| 5,314,749 * | 5/1994 | Shah ............................ 428/910 |
| 5,500,283 | 3/1996 | Kirk et al. . |
| 5,527,608 | 6/1996 | Kemp-Patchett et al. . |

* cited by examiner

*Primary Examiner*—Michael W. Ball
*Assistant Examiner*—Michael A Tolin
(74) *Attorney, Agent, or Firm*—Dennis P. Santini; T. Dean Simmons

(57) ABSTRACT

Methods of preparing biaxially oriented polyethylene films with improved optics and sealability properties are provided. The methods include stretching in the machine direction a multi-layer base sheet having a core layer with a first and a second side, at least one skin layer and outer surfaces; then coating at least one of the outer surfaces with a resin selected from the group consisting of low density polyethylene, very low density polyethylene, linear low density polyethylene and blends thereof, and finally, stretching the base sheet in a direction transverse to the machine direction.

10 Claims, No Drawings

BIAXIALLY ORIENTED POLYETHYLENE FILM WITH IMPROVED OPTICS AND SEALABILITY PROPERTIES

BACKGROUND OF THE INVENTION

The present invention relates to methods of preparing polymer films. Specifically, the present invention relates to methods of preparing biaxially oriented polyethylene films with improved optics and sealability properties.

Generally, in the preparation of a film from granular or pelleted polymer resin, the polymer is first extruded to provide a stream of polymer melt, and then the extruded polymer is subjected to the film-making process. Film-making typically involves a number of discrete procedural stages including melt film formation, quenching and windup. For a general description of these and other processes associated with film-making, see K R Osborn and W A Jenkins, *Plastic Films: Technology and Packaging Applications*, Technomic Publishing Co., Inc., Lancaster, Pa. (1992).

An optional part of the film-making process is a procedure known as "orientation." The "orientation" of a polymer is a reference to its molecular organization, i.e., the orientation of molecules relative to each other. Similarly, the process of "orientation" is the process by which directionality (orientation) is imposed upon the polymeric arrangements in the film. The process of orientation is employed to impart desirable properties to films, including making cast films tougher (higher tensile properties). Depending on whether the film is made by casting as a flat film or by blowing as a tubular film, the orientation process requires substantially different procedures. This is related to the different physical characteristics possessed by films made by the two conventional film-making processes; casting and blowing. Generally, blown films tend to have greater stiffness and toughness. By contrast, cast films usually have the advantages of greater film clarity and uniformity of thickness and flatness, generally permitting use of a wider range of polymers and producing a higher quality film.

Orientation is accomplished by heating a polymer to a temperature at or above its glass-transition temperature ($T_g$) but below its crystalline melting point ($T_m$), and then stretching the film quickly. On cooling, the molecular alignment imposed by the stretching competes favorably with crystallization and the drawn polymer molecules condense into a crystalline network with crystalline domains (crystallites) aligned in the direction of the drawing force. As a general rule, the degree of orientation is proportional to the amount of stretch and inversely related to the temperature at which the stretching is performed. For example, if a base material is stretched to twice its original length (2:1) at a higher temperature, the orientation in the resulting film will tend to be less than that in another film stretched 2:1 but at a lower temperature. Moreover, higher orientation also generally correlates with a higher modulus, i.e., measurably higher stiffness and strength. Further, as a general rule, higher orientation correlates with films having improved gloss and haze characteristics in the absence of cavitation.

When a film has been stretched in a single direction (monoaxial orientation), the resulting film exhibits great strength and stiffness along the direction of stretch, but it is weak in the other direction, i.e., across the stretch, often splitting or tearing when flexed or pulled. To overcome this limitation, two-way or biaxial orientation is employed to more evenly distribute the strength qualities of the film in two directions. These biaxially oriented films tend to be stiffer and stronger, and also exhibit much better resistance to flexing or folding forces, leading to their greater utility in packaging applications.

Most biaxial orientation processes use apparatus that stretches the film sequentially, first in one direction and then in the other. Tenter frame orienting apparatus stretches the film first in the direction of the film travel, i.e., in the longitudinal or "machine direction" (MD), and then in the direction perpendicular to the machine direction, i.e., the lateral or "transverse direction" (TD).

The degree to which a film can be oriented is dependent upon the polymer from which it is made. Polypropylene, polyethylene terephthalate (PET), and nylon are highly crystalline polymers that are readily heat stabilized to form dimensionally stable films. These films are well known to be capable of being biaxially stretched to many times the dimensions in which they are originally cast (e.g., 5× by 8× or more for polypropylene).

High density polyethylene (HDPE), however, exhibits even higher crystallinity (e.g., about 80–95%) relative to polypropylene (e.g., about 70%). As a result, HDPE films are generally more difficult to biaxially orient than polypropylene films. U.S. Pat. Nos. 4,870,122 and 4,916,025 and U.S. application Ser. Nos. 08/715,546 and 08/940,261 describe imbalanced biaxially oriented HDPE-containing films that are MD oriented up to about two times, and TD oriented at least six times. This method produces a film that tears relatively easily in the transverse direction. Multi-layer films prepared according to this method are also disclosed in U.S. Pat. Nos. 5,302,442, 5,500,283 and 5,527,608, which are incorporated herein by reference.

The film-making process can also include extrusion coating a film to impart superior characteristics to the film and methods of extrusion coating are well known in the art. Most known methods provide for extrusion coating a film after it has been biaxially oriented. However, the gloss and haze characteristics as well as the sealability properties of the films prepared according to these known methods can be improved.

Accordingly, it is one of the purposes of this invention, among others, to provide biaxially oriented polyethylene films with improved optics and sealability properties, by providing economical and relatively uncomplicated methods of making polyethylene films that impart superior characteristics to the films, without requirement for chemical additives such as cross-linking agents, and without requirement for supplemental processing steps such as irradiation of the film.

SUMMARY OF THE INVENTION

It has now been discovered that these and other purposes can be achieved by the present invention, which provides for methods of preparing biaxially oriented polyethylene films with improved optics and sealability properties.

The methods of the present invention provide for stretching in the machine direction a multi-layer base sheet having a core layer with a first and a second side, at least one skin layer and outer surfaces; then extrusion coating at least one of the outer surfaces of the base sheet with a resin selected from low density polyethylene (LDPE), very low density polyethylene (VLDPE), linear low density polyethylene (LLDPE) and blends thereof; and then stretching the base sheet in a direction transverse to the machine direction whereby a biaxially oriented polyethylene film having improved optics and sealability properties is prepared.

The core layer of the base sheet includes a polyethylene and preferably, the polyethylene is a high density polyethylene (HDPE). The thickness of the core layer prior to film preparation is preferably from about 0.25 mil (25 gauge) to about 3.0 mil (300 gauge) (1 mil=0.001 inch=100 gauge).

The skin layer of the base sheet is coextensive with the core layer and the skin layer includes HDPE, LDPE or a copolymer of polypropylene and ethylene. The thickness of the skin layer prior to film preparation is preferably from about 0.01 mil to about 0.15 mil.

As stated above, the methods of the present invention provide for first stretching a multi-layer base sheet in the machine direction. Preferably, the base sheet is stretched in the machine direction to a degree of from 5:1 to about 8:1. Also as stated above, at least one of the outer surfaces of the base sheet is coated with a resin after orienting the base sheet in the machine direction. Preferably, the amount of resin provided should be an amount sufficient to yield a film with 3 to 10 wt % of the film including resin. After coating the base sheet with a resin, the base sheet is oriented in a direction transverse to the machine direction. It is preferable that the base sheet is stretched in a direction transverse to the machine direction to a degree of from 6:1 to about 15:1.

The methods of the present invention also provide for preparing various structured biaxially oriented polyethylene films with improved optics and sealability properties. One preferred method of the present invention provides for producing a film having at least a three layer structure. In particular, a multi-layer base sheet has a core layer, a skin layer and outer surfaces. The base sheet further includes at least one tie layer interposed between the core layer and the skin layer and coextensive with each of the core layer and the skin layer. According to this preferred method, the base sheet is first stretched in the machine direction. Then, at least one of the outer surfaces of the base sheet is extrusion coated with a resin selected from LDPE, VLDPE, LLDPE and blends thereof. Finally, the base sheet is stretched in a direction transverse to the machine direction. The resulting polyethylene film has three layers, however, the resulting film can include more layers if additional tie layers are provided. In addition, the resulting film has improved optics and sealability properties.

Another preferred method of the present invention provides for producing another film having a three-layer structure. In particular, a multi-layer base sheet has a core layer with a first and a second side, a first skin layer coextensive with one of the sides of the core layer and a second skin layer coextensive with the other side of the core layer. According to this preferred method, the base sheet is oriented in the machine direction, then extrusion coated on at least one of its outer surfaces with a resin selected from LDPE, VLDPE, LLDPE and blends thereof, and finally, stretched in a direction transverse to the machine direction. The resulting polyethylene film has three layers, and improved optics and sealability properties.

Another preferred method of the present invention provides for preparing a film having a five-layer structure. In particular, a multi-layer base sheet is provided and includes a core layer interposed between two tie layers wherein the first tie layer is interposed between the core layer and a first skin layer, and wherein the second tie layer is interposed between the core layer and the second skin layer. The tie layers are each coextensive with the core layer and the skin layers are each coextensive with their adjacent tie layer. The multi-layer base sheet is biaxially oriented in the machine direction, then at least one of the outer surfaces of the base sheet is extrusion coated with a resin selected from LDPE, VLDPE, LLDPE and blends thereof, and finally, the base sheet is oriented in a direction transverse to the machine direction.

The present invention provides methods of preparing biaxially oriented polyethylene films with improved gloss and haze characteristics and sealability properties. The films also have excellent barrier, dead-fold and mechanical properties. These properties make these films an excellent alternative to blown HDPE films in which much thicker gauges are required.

These and other advantages of the present invention will be appreciated from the detailed description and examples which are set forth herein. The detailed description and examples enhance the understanding of the invention, but are not intended to limit the scope of the invention.

DETAILED DESCRIPTION OF THE INVENTION

The present invention provides for methods of preparing biaxially oriented polyethylene films with improved optics and sealability properties. To practice the methods of the present invention, a multi-layer base sheet is provided wherein the base sheet has a core layer with a first and a second side, at least one skin layer coextensive to the core layer, and outer surfaces. According to the methods of the present invention, the base sheet is first oriented in the machine direction, then at least one of the outer surfaces of the base sheet is extrusion coated with a resin selected from LDPE, VLPDE, LLDPE, and blends thereof, and finally, the base sheet is oriented in a direction transverse to the machine direction ("the transverse direction"). The resulting film has improved haze and gloss, and good sealability properties.

The core layer of the base sheet includes a polyethylene. Preferably, the polyethylene is a HDPE. The amount of the polyethylene provided in the core layer prior to film preparation should be an amount sufficient to yield a core layer in the resulting film having a thickness of from about 0.25 mil to about 3.0 mil, preferably about 0.5 mil to about 2.0 mil.

As the term "high density polyethylene" (HDPE) is used herein, it is defined to mean an ethylene-containing polymer having a density of 0.940 or higher. (Density (d) is expressed as $g/cm^3$) One particularly suitable HDPE for use with the methods of the present invention is the resin sold as M6211 (d=0.958) by Equistar. Another particularly suitable HDPE is the resin sold as HD 7845.30 (d=0.958) by Exxon. Other suitable HDPE resins include, for example, BDM 94-25 (d=0.961) and 6573 XHC (d=0.959) which are both available from Fina Oil and Chemical Co., Dallas, Tex. and Sclair 19C (d=0.951) and 19F (d=0.961) which are both available from Nova Corporation, Sarnia, Ontario, Canada.

The Melt Index (MI) of the HDPE useful according to the prevention is in the range of from about 0.1 to about 10. (Melt Index is expressed as g/10 min.) Preferably, the HDPE has a melt index in the range of from about 0.3 to about 1.5. Melt index is generally understood to be inversely related to viscosity, and decreases as molecular weight increases. Accordingly, higher molecular weight HDPE generally has a lower melt index. Methods for determining melt index are known in the art, e.g., ASTM D 1238.

The skin layer includes a copolymer of polypropylene and ethylene wherein 85 to 99% of the skin layer includes polypropylene and 1 to 15% of the skin layer includes ethylene. Preferably, polypropylene is 95 to 98% of the skin layer and ethylene is 2 to 5% of the skin layer. The thickness of the skin layer prior to film preparation is from about 0.01 mil to about 0.15 mil, preferably about 0.05 mil.

Polyethylene films prepared according to the present invention are biaxially oriented. Biaxial orientation is employed to evenly distribute the strength qualities of a film in the longitudinal or "machine direction" (MD) of the film and in the lateral or "transverse direction" (TD) of the film. Biaxial oriented films tend to be stiffer and stronger, and also exhibit much better resistance to flexing and folding forces, leading to greater utility and packaging applications.

Biaxial orientation can be conducted simultaneously in both directions, however, most biaxial orientation processes use apparatus which stretches the film sequentially, first in one direction and then in the other. A typical apparatus will stretch a film in the machine direction first and then in the transverse direction. The degree to which a film can be stretched is dependent upon factors including, for example, the polymer from thick a film is made. For further discussion concerning biorientation of polyethylene films, see U.S. application Ser. Nos. 08/715,546 and 08/940,261 which are both incorporated herein by reference for all that they disclose.

Usually, the sheet is oriented sequentially, preferably being first stretched in the MD and then stretched in the TD. Thus, the cast material is typically heated (optionally including a pre-heating stage) to its orientation temperature and subjected to MD orientation between two sets of rolls, the second set rotating at a greater speed than the first by an amount effective to obtain the desired draw ratio. Then, the monoaxially oriented sheet is oriented in the TD by heating (again optionally including pre-heating) the sheet as it is fed through an oven and subjected to transverse stretching in a tenter frame. Alternative stretching methods are possible, including employing apparatus capable of simultaneous stretching, or stretching sequentially first in the TD and then in the MD. It is known that these methods often suffer from serious technical limitations rendering them impractical or overly expensive.

A film according to the present invention is made primarily from polyethylene and can be stretched to a relatively high degree. In particular, a film according to a method of the present invention is stretched in the machine direction to a degree of from about 5:1 to about 8:1 and in the transverse direction to a degree from about 6:1 to about 15:1. Nevertheless, as a general rule with the film of this invention, the higher the degree of stretch in both the MD and the TD, the better the gloss and haze is in the resulting film. The temperature at which a film is biaxially oriented ("stretch temperature") can also influence the haze, gloss and sealability properties of the resulting film.

The biaxial orientation processes of the present invention, including any preheating step as well as the stretching steps, are performed using stretch temperatures in the range of from about the glass transition temperature (Tg) of the polyethylene to above the crystalline melting point (Tm) of the polyethylene. More specifically, orientation in the MD is conducted at from about 200° F. to about 320° F., more preferably from about 230° F. to about 295° F. Orientation in the TD is conducted at from about 230° F. to about 350° F., more preferably from about 240° F. to about 320° F. The skilled artisan will understand that the orientation temperature employed in a particular situation will generally depend upon the residence time of the base sheet and the size of the rolls. Apparatus temperature higher than the Tm of the polyethylene sheet can be appropriate if the residence time is short. The skilled artisan also understands that the temperatures involved in these processes are in relation to the measured or set temperatures of the equipment rather than the temperature of the polyethylene itself.

According to the present invention, after a base sheet is stretched in the machine direction and before it is stretched in the transverse direction, the base sheet is extrusion coated with a resin selected from LDPE, VLDPE, LLDPE and blends thereof. The base sheet is extrusion coated on at least one of its outer surfaces with a sufficient amount of resin such that the resin accounts for 3 to 10 wt % of the prepared film. Extrusion coating the base sheet includes first treating the outside of the base sheet with corona discharge to promote adhesion between the base sheet and the extrusion coating layer. The resin to be coated on the base sheet is then extruded with an adjustable flat die and the coating extrudate is then cooled on a chill roll at an extrusion coating station. The base sheet is then applied to the coating extrudate through the chill roll.

The term "low density polyethylene" (LDPE) as used herein is defined to mean an ethylene-containing polymer having a density of about 0.926 or lower and a MI of about 7. LDPE is readily available, e.g., PE 1017 (MI=7; d=0.917) from Chevron, San Francisco, Calif., SLP 9045 (MI=7.5; d=0.908) from Exxon, Houston, Tex., and ZCE 200 (MI=3; d=0.918) from Mobil Chemical Corporation, Fairfax, Va.

The term "very low density polyethylene" (VLDPE) as used herein is defined to mean an ethylene-based hexane copolymer having a density of from about 0.890 to about 0.915 and a MI of from about 3 to about 17. VLDPE is readily available from Exxon, e.g., Exact Plastomer SLP-9087 (MI=7.5; d=0.900) and Exact Plastomer SLP-9088 (MI=16.5; d=0.900). Other suitable VLDPE resins include, for example, product No. 1137 (MI=8; d=0.906) from Union Carbide, Danbury, Conn. and product No. XPR 0545-33260 46L (MI=3.3; d=0.908) from Dow Chemical Company, Midland, Mich.

The term "linear low density polyethylene" (LLDPE) as used herein is defined to mean a copolymer of ethylene and a minor amount of an olefin containing 4 to 10 carbon atoms, having a density of from about 0.910 to about 0.926 and a MI of from about 0.5 to about 10. LLDPE is readily available, e.g., Dowlex™ 2045.03 (MI=1.1; d=0.920) from Dow Chemical Company, Midland, Mich.

According to the present invention, the base sheet can have a various number of layers providing for various structured polyethylene films to be prepared. One preferred method of the present invention provides for producing a film having at least a three layer structure. In particular, a multi-layer base sheet has a core layer, a skin layer and outer surfaces. The base sheet further includes at least one tie layer interposed between the core layer and the skin layer and coextensive with each of the core layer and the skin layer. According to this preferred method, the base sheet is first stretched in the machine direction. Then, at least one of the outer surfaces of the base sheet is extrusion coated with a resin selected from LDPE, VLDPE, LLDPE and blends thereof, and finally, the base sheet is stretched in the transverse direction. The resulting polyethylene film has three layers, however, the resulting film can include more layers if additional tie layers are provided. In addition, the resulting film has improved optics and sealability properties.

Another preferred method of the present invention provides for producing another film having a three-layer structure. In particular, a multi-layer base sheet has a core layer with a first and a second side, a first skin layer coextensive with one of the sides of the core layer and a second skin layer coextensive with the other side of the core layer. According to this preferred method, the base sheet is oriented in the machine direction, then extrusion coated on at least one of its outer surfaces with a resin selected from LDPE, VLDPE, LLDPE and blends thereof, and finally, stretched in the transverse direction. The resulting polyethylene film has three layers, and improved optics and sealability properties.

Another preferred method of the present invention provides for preparing a film having a five-layer structure. In particular, a multi-layer base sheet is provided and includes a core layer interposed between two tie layers wherein the first tie layer is interposed between the core layer and a first skin layer, and wherein the second tie layer is interposed between the core layer and the second skin layer. The tie layers are each coextensive with the core layer and the skin layers are each coextensive with their adjacent tie layer. The multi-layer base sheet is biaxially oriented in the machine direction, then at least one of the outer surfaces of the base sheet is extrusion coated with a resin selected from LDPE, VLDPE, LLDPE and blends thereof, and finally, the base sheet is oriented in the transverse direction.

While these and other embodiments can be prepared according to the methods of the present invention, it should be noted that several other film structures having multiple layers with varying compositions and thicknesses can be prepared having improved optics and sealability properties in accordance with the present invention.

Cavitating agents can be used with the methods of the present invention to generate voids (cavities) in the structure of the film. In particular, cavitating agents can be added into the tie or core layers of the multi-layer base sheet before orientation in the MD. It is believed that small inhomogeneities introduced into the base sheet by the cavitating agent result in points of weakness in the sheet. The biaxial orienting process then induces small tears in the polyethylene, causing cavitation in the resulting film. Suitable cavitating agents include, for example, calcium carbonate ($CaCO_3$), titanium oxide ($TiO_2$), polystyrene, polybutylene terephthalate (PBT), nylon 6, crosslinked polystyrene and polymethylmethacrylate (PMMA). Organic cavitating agents are generally less preferred due to their limited operating temperature range. However, such organic cavitants can be useful if they are extremely finely divided and are either resistant to melt at operating temperatures or produce a suitable inhomogeneity in the polyethylene material. Cavitating agents such as $CaCo_3$, $TiO_2$ and polystyrene can be included in the core layer in an amount of from about 5 wt % to about 25 wt % of the core layer. Further, cavitating agents can be included using methods known in the art, such as that described in U.S. application Ser. No. 07/993,983, incorporated herein by reference.

The films prepared according to the methods of the present invention can be surface treated with conventional methods to improve wettability of the film and ink receptivity. Films can be further coated by known methods to modify barrier characteristics, provide heat seal properties and modify surface characteristics. The films can be modified by metallization to obtain a metal-like appearance and altered barrier characteristics.

The films prepared according to the methods of the present invention are useful in numerous applications including food packaging and in particular, in food packaging where good sealability is desirable such as the packaging of cereal products, salty snacks and ice cream novelty. The films prepared according to the methods of the present invention also have improved optics which makes them advantageous for use in cigarette pack inner liners, as over wrap for butter, chocolate, candy, etc., and as twistwrap.

The following examples are provided to assist in further understanding the invention. The particular materials and conditions employed are intended to be further illustrative of the invention and are not limiting upon the reasonable scope thereof.

A series of experiments were performed to illustrate features and advantages of the present invention. Several of the manufacturing conditions were common to each case. For example, the results shown in Examples 2–4 were obtained after stretching a base sheet in the machine direction, then extrusion coating it with a resin and finally, stretching it in the transverse direction. In addition, conventional orienting equipment was used in orienting the base sheet in each direction.

EXAMPLE 1

TABLE 1 shows the structure of a base sheet prior to film preparation according to the present invention. TABLE 2 shows the structure of a film prepared according to the present invention and from the base sheet shown in TABLE 1.

TABLE 1

| Layers (from top to bottom) | Composition of Layer | Layer Thickness (mil) |
|---|---|---|
| Skin | Polypropylene + Ethylene | 0.05 |
| Tie | LDPE | 0.05 |
| Core | HDPE | 1.20 |
| Tie | LDPE | 0.05 |
| Skin | Polypropylene + Ethylene | 0.05 |

It should be noted that the top side of this base sheet is the air knife side and the bottom side of the base sheet is the caster side.

As shown in TABLE 1, the core layer of the base sheet includes HDPE and the skin layers include a copolymer of polypropylene and ethylene preferably including about 90 to 98% of polypropylene and about 2 to 10% of ethylene. Since the ethylene-polypropylene copolymer of the skin layers does not adhere well with the core layer of HDPE, tie layers of LDPE are interposed between the skin layers and the core layer to improve adhesion.

TABLE 2

| Layers (from top to bottom) | Composition of Layer | Layer Thickness (mil) |
|---|---|---|
| Extrusion Coating | 80% VLDPE + 20% LDPE | 0.03–0.05 |
| Skin | Polypropylene + Ethylene | 0.05 |
| Tie | LDPE | 0.05 |
| Core | HDPE | 1.20 |
| Tie | LDPE | 0.05 |
| Skin | Polypropylene + Ethylene | 0.05 |

It should be noted that the top side of this film structure is the air knife side and the bottom side of the film structure is the caster side.

The resulting film shown in TABLE 2 was prepared by first orienting the base sheet shown in TABLE 1 in the machine direction. Then, the outside of the base sheet was treated with corona discharge to promote adhesion between the base sheet and the extrusion coating layer. The resin to be coated on the base sheet was then extruded with an adjustable flat die and the coating extrudate was cooled on a chill roll at an extrusion coating station. The base sheet was then applied to the coating extrudate through the chill roll. Finally, the base sheet with coating layer was oriented in the transverse direction. The resulting film has improved optics and sealability properties.

EXAMPLE 2

TABLE 3 shows the sealability properties of films prepared from the base sheet shown in TABLE 1 and having the resulting structure shown in TABLE 2. The films described in TABLE 3 were prepared according to the method described following TABLE 2 in EXAMPLE 1.

TABLE 3

| Sample | Coating Resin | Coating Thickness (mil) | MST (° F.) | Crimp Seal (g/in) | Hot Tack (g/in) | Seal Range (° F.) |
|---|---|---|---|---|---|---|
| 1 | none | 0.00 | — | <5 | N/A | 0 |
| 2 | 80% VLDPE 20% LDPE | 0.03 | 195 | 450 | 108 | >50 |
| 3 | 80% VLDPE 20% LDPE | 0.05 | 180 | 600 | 311 | >50 |
| 4 | 80% VLDPE 20% LDPE | 0.03 | 190 | 430 | 74 | >50 |
| 5 | 80% VLDPE 20% LDPE | 0.05 | 185 | 560 | 108 | >50 |
| 6 | 80% VLDPE 20% LDPE | 0.03 | 185 | 450 | 108 | >50 |

The core layers of the base sheets used to prepare Samples 1–5 included the high density polyethylene Equistar M6211 and the core layer of the base sheet used to prepare Sample 6 included the high density polyethylene Exxon HD7845. In addition, as shown above, a coating was not applied to the base sheet used to prepare Sample 1 during its preparation, but the base sheets used to prepare Samples 2–6 were coated with a resin blend during their preparation. In particular, the base sheets used to prepare Samples 2–6 were coated with a resin including VLDPE and LDPE during their preparation. The LDPE used to prepare Samples 2–6 was Chevron PE 1017. The VLDPE used to prepare Samples 2, 3 and 6 was Exxon Exact SLP 9087 and the VLDPE used to prepare Samples 4 and 5 was Exxon Exact SLP 9088.

A comparison of Sample 1 to Samples 2–6 clearly shows that biaxially oriented polyethylene films without extrusion coating, e.g. Sample 1, cannot be heat sealed under normal conditions. As shown above, the Crimp Seal of Sample 1 was less than 5 g/in compared to the Crimp Seal values of extrusion coated Samples 2–6 which were all greater than 430 g/in. Therefore, Samples 2–6 illustrate that the present invention provides methods for preparing biaxially oriented polyethylene films with good sealability properties.

EXAMPLE 3

The polyethylene films illustrated in TABLE 4 were prepared by extrusion coating a base sheet according to a method of the present invention and show improved haze, gloss and sealability properties.

TABLE 4

| Sample | MDX | Extrusion Coating | TDX | Gloss (% I/O) | Haze (%) | Askco Seal (g/in) | Crimp Seal (g/in) | Hot Tack (g/in at 230° F.) |
|---|---|---|---|---|---|---|---|---|
| 7 | 6.0 | none | 10.4 | 38/28 | 34 | 0 | 0 | 0 |
| 8 | 6.0 | LPDE | 10.4 | 73/70 | 10 | 330 | 370 | 74 |
| 9 | 6.0 | LPDE | 10.4 | 77/85 | 7 | 390 | 415 | 74 |
| 10 | 6.2 | LPDE | 10.4 | 69/75 | 8 | 330 | 360 | 74 |
| 11 | 5.5 | none | 10.4 | 54/29 | 34 | 325 | 395 | 74 |

TABLE 4-continued

| Sample | MDX | Extrusion Coating | TDX | Gloss (% I/O) | Haze (%) | Askco Seal (g/in) | Crimp Seal (g/in) | Hot Tack (g/in at 230° F.) |
|---|---|---|---|---|---|---|---|---|
| 12 | 5.7 | none | 10.4 | 57/37 | 25 | 365 | 340 | 74 |
| 13 | 5.9 | none | 10.4 | 56/37 | 27 | 370 | 315 | 74 |

Samples 7 was prepared by orienting a base sheet in the machine direction and then orienting the base sheet in the transverse direction. Samples 8–10 were prepared by orienting a base sheet in the machine direction, then coating the base sheet with a LDPE, and finally, orienting the base sheet in the transverse direction. Samples 11–13 were prepared by coextrusion with LDPE prior to biaxial orientation. Samples 7–13 were all oriented in the machine direction at similar stretch temperatures and in the transverse direction at similar stretch temperatures.

The base sheets used to prepare each of Samples 7–13 included a core layer of HDPE. Further, each of the base sheets used to prepare Samples 7–14 included tie layers of HDPE. The skin layers of each of the base sheets used to prepare Samples 7–13 were not the same. In particular, the base sheet of Sample 7–10 included HDPE skin layers where as Samples 11–13 included LDPE skin layers.

Comparing Sample 7 to Samples 8–10, it is readily apparent that Samples 8–10, each of which included an extrusion coating layer, had higher gloss and lower haze than the film of Sample 7 which was not extrusion coated. In addition, Samples 8–10 each had good seal properties, both Askco and Crimp, compared to Sample 7, which was not sealable. Samples 11–13 also had good seal properties compared to Sample 7, however, these films were coextruded with LDPE prior to biaxial orientation.

In comparing Samples 8–10 to Samples 11–13, it is readily apparent that the extrusion coated films of the present invention, Samples 8–10, are more desirable in the packaging industry. Though Samples 11–13 each had better haze and gloss values than Sample 7 the haze values were still greater than 25% and the gloss was still less than 60%. The extrusion-coated films of Samples 8–10 included significantly lower haze values and gloss values.

EXAMPLE 4

TABLE 5 illustrates the improved sealability properties of films prepared according to the methods of the present invention.

TABLE 5

| Sample | Coating - Resin | Gloss I/O (%) | Haze (%) | Askco MST (° F.) | Askco Seal Max (g/in) |
|---|---|---|---|---|---|
| 14 | none | 93/88 | 4 | 0 | 0 |
| 15 | none | 86/84 | 7 | — | 0 |
| 16 | none | 81/79 | 8 | — | 0 |
| 17 | none | 77/81 | 10 | — | 0 |
| 18 | LDPE | 56/61 | 10 | 260 | 470 |
| 19 | none | 83/84 | 8 | — | 0 |
| 20 | LDPE | 78/74 | 8 | 220 | 640 |
| 21 | LDPE | 66/56 | 12 | 230 | 1020 |
| 22 | LDPE | 64/53 | 13 | <200 | 830 |
| 23 | LDPE | 70/68 | 11 | 210 | 770 |

The base sheets used to prepare Samples 14–23 were all oriented to the same degree during film preparation except for the base sheets used to prepare Samples 16 and 17 which were oriented to a higher degree in the machine direction compared to the base sheets used to prepare Samples 15 and 18–23. In addition, the base sheets used to prepare Samples 14–23 were all oriented at an MDO temperature of 260–275° F. and a TDO temperature of 307/260° F.

The base sheets used to prepare each of Samples 14–23 included a core layer of a high density polyethylene. Further, the HDPE core layer of each of Samples 14–23 was coextruded with ethylene-polypropylene copolymer skins. Accordingly, Samples 14–23 were expected to exhibit high gloss and low haze since it is known that films having a HDPE core with coextruded skin layers of an ethylene-polypropylene copolymer exhibit good gloss and haze characteristics.

However, films having a HDPE core with coextruded ethylene-polypropylene copolymer skins are not sealable. The purpose, though, of this example is to show that films having an extrusion-coated skin layer have improved sealable properties. Samples 18 and 20–23 were coated with a LDPE resin according to the present invention. As shown above by the Askco MST and the Asko Seal data, Samples 14–17 and 19 which were not extrusion coated during their preparation, were not sealable as expected whereas Samples 18 and 20–23 which were extrusion coated with a LDPE resin, were sealable.

Thus, while there have been described what are presently believed to be the preferred embodiments of the present invention, those skilled in the art will realize that other and further embodiments can be made without departing from the spirit of the invention, and it is intended to include all such further modifications and changes as come within the true scope of the claims set forth herein.

What is claimed is:

1. A method of preparing film comprising:
   (a) stretching in the machine direction a multi-layer base sheet having a core layer comprised of polyethylene with a first and a second side, at least one skin layer and outer surfaces;
   (b) extrusion coating at least one of said outer surfaces with a resin selected from the group consisting of low density polyethylene (LDPE), very low density polyethylene (VLDPE), linear low density polyethylene (LLDPE) and blends thereof; and
   (c) stretching said base sheet in a direction transverse to the machine direction.

2. A method according to claim 1, wherein step (a) comprises stretching said base sheet in the machine direction to a degree of from about 5:1 to about 8:1.

3. A method according to claim 1, wherein step (c) comprises stretching said base sheet in a direction transverse to the machine direction to a degree of from about 6:1 to about 15:1.

4. A method according to claim 1, wherein said core layer comprises high density polyethylene (HDPE).

5. A method according to claim 1, wherein said resin comprises 3 to 10 wt % of said film.

6. A method according to claim 1, wherein said base sheet of step (a) further comprises at least one tie layer interposed between said core layer and said skin layer and coextensive with each of said core layer and said skin layer.

7. A method according to claim 1, wherein said base sheet of step (a) comprises a first skin layer coextensive with one of said sides of said core layer and a second skin layer coextensive with the other side of said core layer.

8. A method according to claim 7, wherein:

a first tie layer is interposed between said core layer and said first skin layer, coextensive with each of said core layer and said first skin layer, and a second tie layer is interposed between said core layer and said second skin layer, coextensive with each of said core layer and said second skin layer.

9. A method according to claim 1, wherein said core layer has a thickness of from about 0.25 mil. (25 gauge) to about 3.0 mil. (300 gauge).

10. A method according to claim 1, wherein said skin layer has a thickness of from about 0.01 mil. (1 gauge) to about 0.15 mil. (15 gauge).

* * * * *